United States Patent
Hayashi

(10) Patent No.: US 8,050,537 B2
(45) Date of Patent: Nov. 1, 2011

(54) IMAGE AND AUDIO RECORDING APPARATUS

(75) Inventor: Norihisa Hayashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1189 days.

(21) Appl. No.: 11/637,522

(22) Filed: Dec. 11, 2006

(65) Prior Publication Data

US 2007/0160349 A1  Jul. 12, 2007

(30) Foreign Application Priority Data

Dec. 12, 2005  (JP) ................................. 2005-357113

(51) Int. Cl.
*H04N 5/76* (2006.01)

(52) U.S. Cl. ....................................... 386/291; 386/292

(58) Field of Classification Search .................. 386/237, 386/291, 292, 338
See application file for complete search history.

(56) References Cited

U.S. PATENT DOCUMENTS

| 5,761,180 | A | 6/1998 | Murabayashi et al. | |
| 2006/0198609 | A1* | 9/2006 | Ogata et al. | 386/95 |

FOREIGN PATENT DOCUMENTS

| JP | 07-322202 | | 12/1995 |
| JP | 09-214872 | A | 8/1997 |
| JP | 11-032289 | A | 2/1999 |
| JP | 2001-036825 | A | 2/2001 |
| JP | 2001-086456 | | 3/2001 |

OTHER PUBLICATIONS

Korea Intellectual Property Office (KIPO) office action dated Nov. 16, 2007 for KIPO patent application KR10-2006-0125560.

Japan Patent Office (JPO) office action for JPO patent application JP2005-357113 (Dec. 1, 2009).

* cited by examiner

*Primary Examiner* — Robert Chevalier

(74) *Attorney, Agent, or Firm* — Kilpatrick Townsend & Stockton LLP

(57) ABSTRACT

An image and audio recording apparatus has a function of recording image data and/or audio data on a recording medium and a function of recording data on a set time band with a timer. When the timer-recording function is caused to set the recording operation, the recording of the image data may be set separately from the recording of the audio data.

7 Claims, 16 Drawing Sheets

FIG. 18

| | DAY OF THE WEEK | START TIME | | END TIME | IMAGE | SOUND |
|---|---|---|---|---|---|---|
| 1 | MON TUE WED THU FRI SAT SUN | 22 : 00 | ~ | 04 : 00 | NOT RECORD | RECORD |
| 2 | MON TUE WED THU FRI SAT SUN | 10 : 00 | ~ | 20 : 00 | RECORD | NOT RECORD |
| 3 | —————— | — : — | ~ | — : — | - - - - - - - | - - - - - - - |
| 4 | —————— | — : — | ~ | — : — | - - - - - - - | - - - - - - - |
| 5 | —————— | — : — | ~ | — : — | - - - - - - - | - - - - - - - |
| 6 | —————— | — : — | ~ | — : — | - - - - - - - | - - - - - - - |
| 7 | —————— | — : — | ~ | — : — | - - - - - - - | - - - - - - - |
| 8 | —————— | — : — | ~ | — : — | - - - - - - - | - - - - - - - |

TIMER RESERVATION MENU (IMAGE AND SOUND)

END

1801

IMAGE AND AUDIO RECORDING APPARATUS

The present application claims priority from Japanese application JP2005-357113 filed on Dec. 12, 2005, the content of which is hereby incorporated by reference into this application.

BACKGROUND OF THE INVENTION

The present invention relates to an image and audio recording apparatus.

One of the background arts in the technical field to which the present invention pertains is described in JP-A-2001-86456. JP-A-2001-86456 has as a problem the disclosure of "for setting a timer recording operation, in one day, the time when the recording is to be executed is separated from the time when the recording is not to be executed or though plural settings and recording intervals may be preset, the setting becomes the same in each day of the week. The timer recording operation did not have a facility of executing detailed settings and further had a difficulty in setting plural recording schedules in one day and making different settings in each day of the week." JP-A-2001-86456 has as a solving means the disclosure of "For solving these problems, the present invention provides a capability of displaying two programs of a schedule-creating screen for one week on one screen so that plural programs may be easily set by switching the pages and of creating the recording preset screens (for specifying a recording interval, an image quality, an image resolution, a recording mode and so forth) in which various kinds of recording methods are preset so that the concerned preset may be specified in the concerned schedule."

Another background art in the technical field to which the present invention pertains is described in JP-A-7-322202. The JP-A-7-322202 has as an object the disclosure of "An object is to enhance the using efficiency of a file device in the moving image storage apparatus" and as an arrangement the disclosure of "The non-video state detector 4 and the non-audio state detector 6 detect a non-video state and a non-audio state. For coding the moving image, in the non-video state, the non-video data code is used for coding and in the non-audio state the non-audio data code is used for coding. For synchronizing the video data with the audio data, the synchronous signal adder 7 adds the synchronous signal to the coded data. In decoding the moving image, based on the synchronous signal added in coding, the moving image is decoded by the synchronous detector 10, the image decoder 11 and the sound decoder 12."

The image and audio recording apparatus provided with a harddisk drive mainly used for a monitoring system is required to record the image data and audio data as long as possible in a recording medium with a limited capacity. For the purpose of recording only a requisite minimum amount of data, therefore, the image and audio recording apparatus effectively uses various kinds of recording schemes such as high compression recording of data to be recorded, intermittent recording of data to be recorded, recording of data in response to detection of an alarm, recording of data in response to a motion detector and timer recording of data, for realizing long-term recording.

In the meantime, in a case that only minimum data is required to be recorded in the image and audio recording apparatus provided in the monitoring system, it is necessary to change data to be recorded depending on a monitoring time band and a monitoring object. For example, assume to monitor a shop in time bands: from 4:00 to 22:00 when one or more employees exist, the business hours from 10:00 to 20:00 and the lights-out time ranges from 22:00 to 4:00. During the business hours, the noises in the shop disallow the voices of the persons in the shop to be clearly captured. Hence, it is possible to stop recording of voices in the data recording. During the lights-out time, the shortage of light disallows the object to be captured by a monitoring camera. Hence, it is possible to stop recording of images in data recording. Further, during the time bands of 4:00 to 10:00 and 20:00 to 22:00 before and after the business hours, only the employees exist in the shop for the preparation of opening or closing the shop, it is necessary to clearly record the image as well as the conversation in care for illegal deeds, and it is necessary to record the image and the sound. Therefore, for recording minimum amount of data, it is necessary to specify recording of the image only in the business hours (10:00 to 20:00), recording of the sound only in the lights-out time (22:00 to 4:00), and recording of the image and the sound in the time except the business hours and the lights-out time (20:00 to 22:00, 4:00 to 10:00).

However, the prior art disclosed in the JP-A-2001-86456 does not make any consideration of separately setting recording of image and recording of sound when setting the timer recording. Hence, this prior art does not provide a capability of setting "recording of the sound only in a specific time band" or "recording of only the image in another specific time band". Hence, in the case of setting the timer recording in the business hours (10:00 to 20:00), not only the necessary image but also the unnecessary sound are recorded. As such, disadvantageously, the unintentional recording of the unnecessary image or sound becomes an obstacle to long-term recording.

Further, the prior art disclosed in JP-A-7-322202 does not make any consideration of separately setting recording of image and recording of sound when setting a timer recording. Moreover, the data encoded from the picturelss image or the voiceless sound data still has a predetermined data amount.

Disadvantageously, therefore, the recording time is made shorter according to the predetermined data amount.

SUMMARY OF THE INVENTION

By making separate settings of recordings of image data and audio data in respective time bands possible, the usability may be improved in reducing unnecessary image or audio recorded data and thereby prolonging the recording time more.

An object of the present invention is to improve a usability of the image and audio recording apparatus.

The foregoing object is achieved by the inventions described in the claims.

According to the present invention, a usability of the image and audio recording apparatus is improved.

Other objects, features and advantages of the invention will become apparent from the following description of the embodiments of the invention taken in conjunction with the accompanying drawings.

BRIEF DESCRIPTION OF THE DRAWINGS

FIG. 18 is a view showing an exemplary screen of a timer reservation menu used in a second embodiment of the present invention;

DESCRIPTION OF THE EMBODIMENTS

The embodiments of the image and audio recording apparatus according to the present invention, used in a monitoring system, will be described with reference to FIGS. 1 to 20.

1. First Embodiment

The first embodiment of the image and audio recording apparatus according to the present invention will be described with reference to FIGS. 1 to 17.

Figure 1:
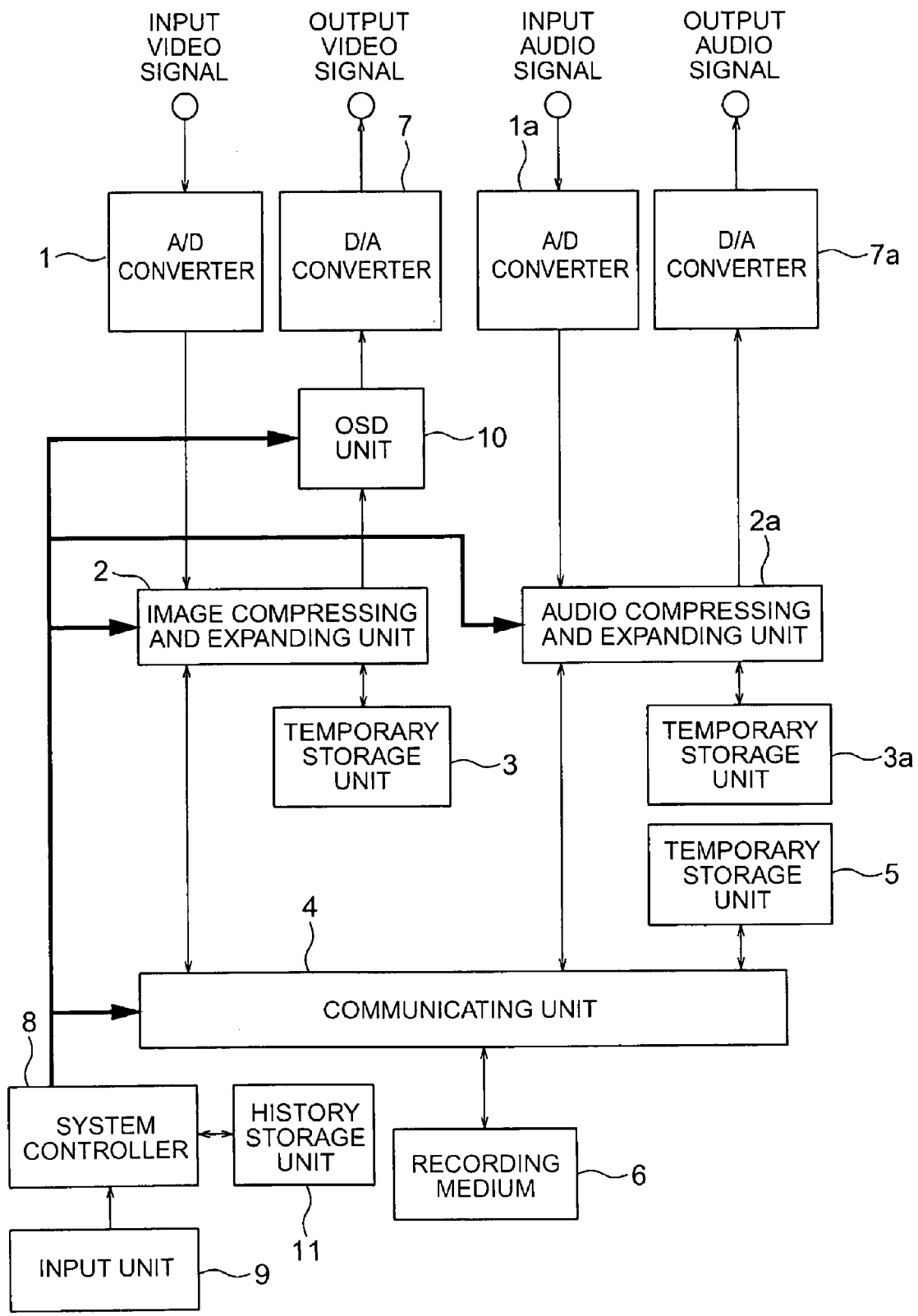
FIG. 1 is a block diagram showing an image and audio recording apparatus according to a first embodiment of the present invention.

FIG. 1 is a block diagram showing the image and audio recording apparatus according to the first embodiment of the present invention. The operation and its flow will be described separately in recording and reproducing the image and the sound.

In recording the image, a video signal inputted from a monitoring camera is converted from an analog signal into a digital signal through an A/D converter 1. The digital image data is compressed in an image compressing and expanding unit 2. In this time, the image data being compressed is temporarily stored in a temporary storage unit 3. In response to an instruction issued by a system controller 8, the compressed image is synthesized with management information such as time information by a communicating unit 4 for a recording medium (simply referred to as the communicating unit 4) and recorded in the recording medium such as a hard disk. In this time, the compressed image data being communicated between the image compressing and expanding unit 2 and the recording medium 6 is stored in a temporary storage unit 5 by the communicating unit 4.

In reproducing the image, the compressed image data read out of the recording medium 6 is transmitted to the image compressing and expanding unit 2 via the communicating unit 4. In the unit 2, the compressed image data is expanded. In this time, the compressed image data being communicated between the recording medium 6 and the image compressing and expanding unit 2 is stored in the temporary storage unit 5 under the control of the communicating unit 4. Further, the image data being expanded in the image compressing and expanding unit 2 is also stored in the temporary storage unit 3. The expanded image data is overlapped with character information and so forth by an OSD (on-screen display) unit 10. Then, the resulting image is converted from the digital signal into the analog signal by the D/A converter 7. The analog image data is outputted as an output video signal.

In recording the sound, the audio signal collected through a microphone is converted from the analog signal into the digital signal through an A/D converter 1a. The digital audio data is compressed by an audio compressing and expanding unit 2a. At this time, the audio data being compressed is stored in a temporary storage unit 3a. In response to an instruction issued from the system controller 8, the compressed audio data is synthesized with the management information such as time information. The synthesized data is recorded as recording data on the recording medium 6. In this case, the compressed audio data being communicated between the audio compressing and expanding unit 2a and the recording medium is stored in the temporary storage unit 5 under the control of the communicating unit 4.

In reproducing the sound, the compressed audio data read out of the recording medium 6 is transmitted to the audio compressing and expanding unit 2a by the communicating unit 4. In this time, the compressed audio data being communicated between the recording medium 6 and the audio compressing and expanding unit 2a is stored in the temporary storage unit 5 under the control of the communicating unit 4. Further, the audio data being expanded by the audio compressing and expanding unit 2a is stored in the temporary storage unit 3a. The expanded audio data is converted from the digital signal into the analog signal through the D/A converter 7a. The analog audio data is outputted as an output audio signal.

In recording the image and the sound, the image data and the audio data both compressed by the image compressing and expanding unit 2 and the audio compressing and expanding unit 2a is synthesized with management information such as time information in the communicating unit 4 in response to an instruction issued by the system controller 8. The image data and the audio data are synchronously synthesized (multiplexed) with each other and then the resulting data is recorded as the recording data on the recording medium 6. In this time, the data being communicated between the recording medium 6 and the image compressing and expanding unit 2 or the audio compressing and expanding unit 2a is stored in the temporary storage unit 5 under the control of the communicating unit 4.

In reproducing the image and the sound, the multiplexed data of the compressed image data and the compressed audio data read out of the recording medium 6, is separated into the compressed image data and the compressed audio data through the effect of the communicating unit 4. Then, in response to an instruction issued by the system controller 8, the compressed image data and the compressed audio data are synchronized with each other based on the time information recorded on each of the data and then are expanded by the image compressing and expanding unit 2 and the audio compressing and expanding unit 2a. At this time, the data being communicated between the recording medium 6 and the image compressing and expanding unit 2 or the audio compressing and expanding unit 2a is stored in the temporary storage unit 5 under the control of the communicating unit 4. Further, the image data being expanded by the image compressing and expanding unit 2 is stored in the temporary storage unit 3. The audio data being expanded in the audio compressing and expanding unit 2a is stored in the temporary storage unit 3a. The expanded image data is sent through the OSD unit 10 to the D/A converter 7, in which the expanded image data is converted from the digital signal into the analog signal. The analog image data is outputted as an output video signal. The expanded audio data is converted from the digital signal into the analog signal through the D/A converter 7a. The analog audio data is outputted as an output analog audio signal. Moreover, the history information in operation such as a history of operations done by the input unit 9 is stored in a history storage unit 11 such as a FLASH memory under the control of the system controller 8.

Herein, the operation of setting a timer for reservation according to the present invention will be described below. By the predetermined operation by the input unit 9, the OSD unit 10 is caused to create a menu image and then outputs the menu image as an output video signal to a display device connected outside so that the display device may display the menu image. As a user is viewing the menu image screen, the user sets a timer for reservation. In setting the timer for reservation, the user may set a time band, a necessity of recording image, and a necessity of recording sound. Afterwards, the system becomes the monitoring state. When the time comes to the set time band, the recording operation is started according to the necessity of recording the image or the sound set in setting the timer for reservation.

For example, in the case of setting recording of both the image and the sound, the image data and the audio data compressed by the image compressing and expanding unit 2 and the audio compressing and expanding unit 2a are synthesized with the management information such as the time information by the communicating unit 4 in response to an instruction issued by the system controller 8. At a time, the image data and the audio data are synchronously synthesized (multiplexed) with each other and then the synthesized data is recorded as the recording data on the recording medium 6.

In the case of setting recoding of the image only, the image data compressed by the image compressing and expanding unit 2 is synthesized with the management information such as the time information in response to the instruction issued by the system controller 8 and then the synthesized image data is recorded as the recording data on the recording medium 6. On the other hand, the delivery of the audio data compressed by the audio compressing and expanding unit 2a to the communicating unit 4 is stopped under the control of the system controller 8. Hence, the compressed audio data is not recorded on the recording medium 6.

In the case of setting recording of the sound only, in response to an instruction issued by the system controller 8, the audio data compressed by the audio compressing and expanding unit 2a is synthesized with the management information such as the time information by the communicating unit 4. The synthesized audio data is recorded on the recording medium 6. On the other hand, the delivery of the image data compressed by the image compressing and expanding unit 2 to the communicating unit 4 is stopped under the control of the system controller 8. Hence, the compressed image data is not recorded on the recording medium 6.

As described above, in the case that the recording of the image or the sound is not necessary, the image and audio recording apparatus provides a managing capability for stopping the delivery of the compressed image data or the compressed audio data from the image compressing and expanding unit 2 or the audio compressing and expanding unit 2a to the communicating unit 4 so that the unnecessary data is not recorded on the recording medium 6 under the control of the system controller 8. Hence, the image and audio recording apparatus enables to independently set a necessity of recording the image or the sound in each time band, thereby reducing the unnecessary recording image or audio data and making the long-term recording possible.

Figure 2:
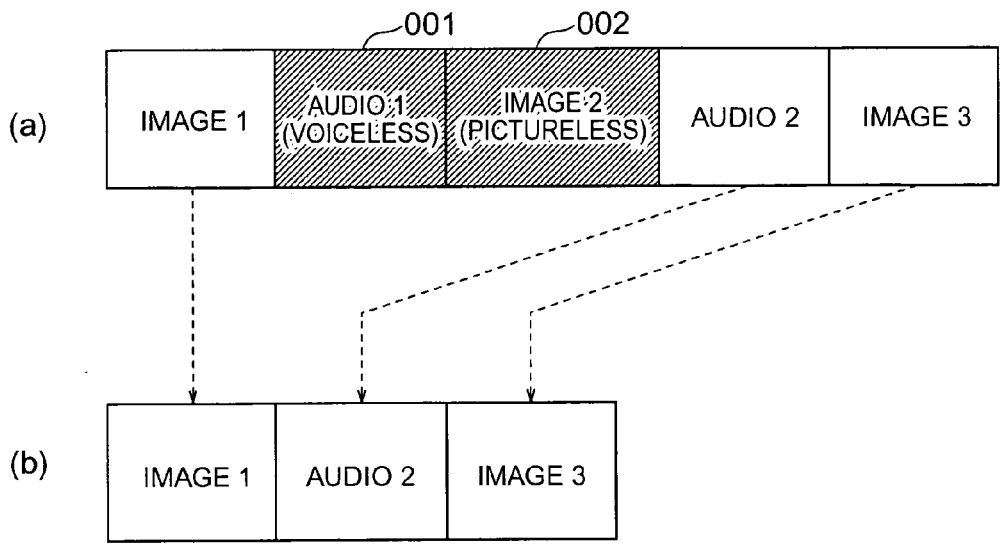
FIG. 2 is a model view showing a recording data structure used in the first embodiment of the present invention.

Herein, the structure of the recording data used in the present invention will be described with reference to FIG. 2. FIG. 2 is a model view showing a structure of the recording data used in the first embodiment of the present invention. In (a) is shown the recording data having the image data and the audio data multiplexed therewith, in which the unnecessary data is recorded as the voiceless sound data and the pictureless image data. In (b) is shown the recording data having the image data and the audio data multiplexed therewith, in which the unnecessary data is not recorded. In (a), the shaded sound 1 (voiceless) 001 and the shaded image 2 (pictureless) 002 correspond to the unnecessary data. In (a), the unnecessary data is treated and recorded as the voiceless sound or the pictureless image like a solid black image. The unnecessary data is not treated as the voiceless data or the solid black image data and not recorded as shown in (b). In the latter case, the amount of the recording data to be recorded on the recording medium 6 may be reduced. This reduction makes the long-term recording possible. For example, in a case that the recording medium 6 is a harddisk unit of 500 GB and the image data is recorded in standard set format, the image data with sound may be recorded for a term of about 40 days, while the image with no sound may be recorded for a term of about 51 days.

In turn, the flow of the process of setting a timer recording operation according to the present invention and its display example will be described with reference to FIGS. 3 to 10.

Figure 3:
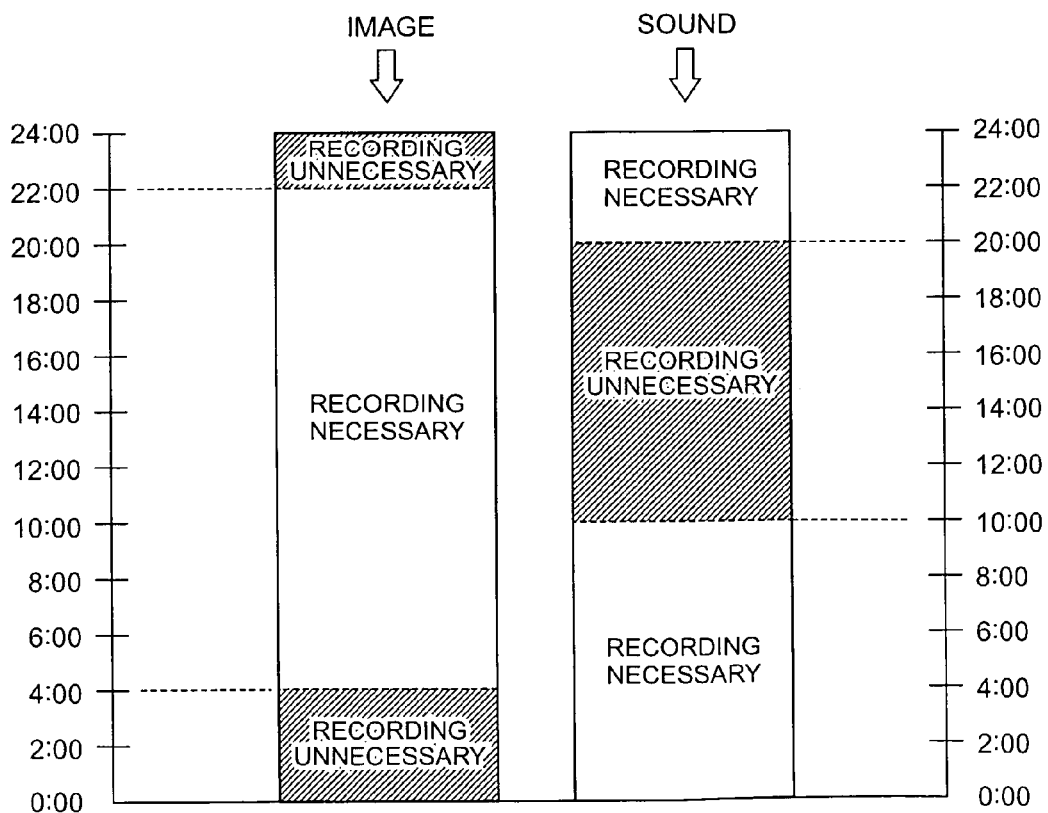
FIG. 3 is a view showing a timer reservation list used in the first embodiment of the present invention.
Figure 4:
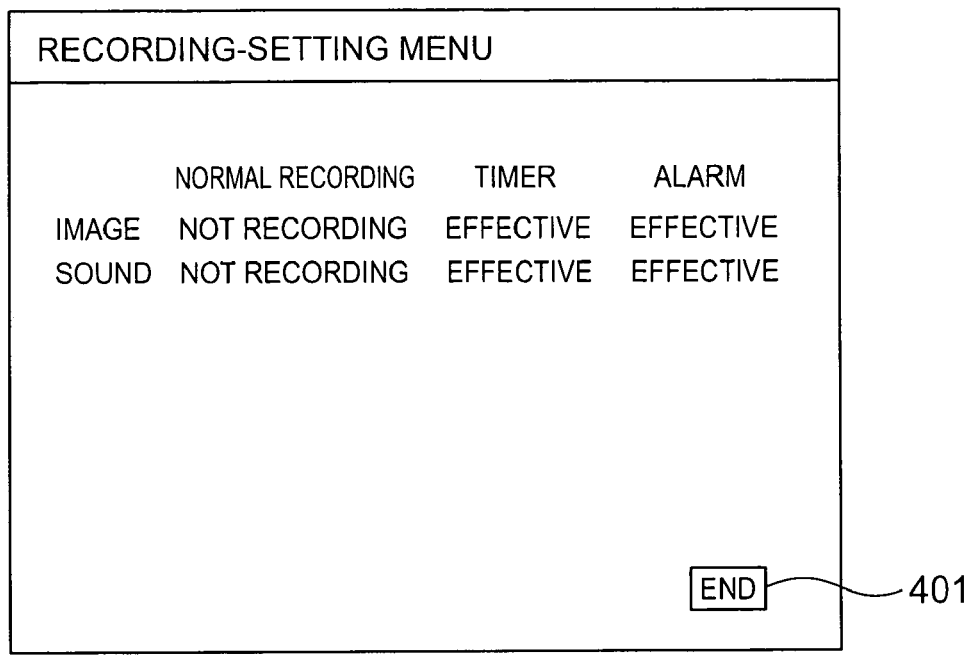
FIG. 4 is a view showing a recording-setting menu screen used in the first embodiment of the present invention.
Figure 5:
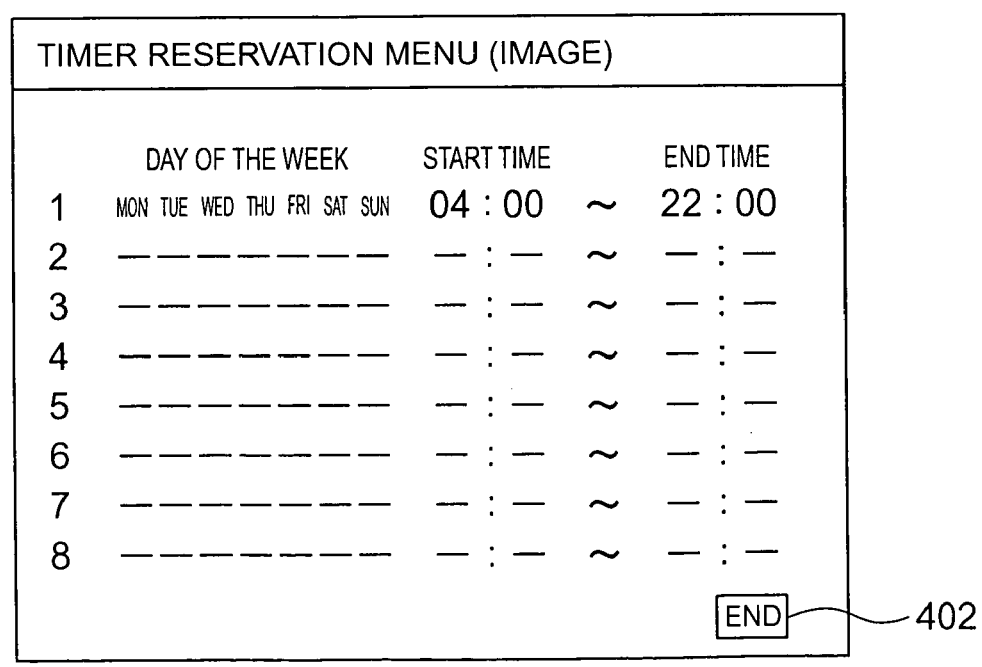
FIG. 5 is a view showing an exemplary screen of a timer reservation menu (image) used in the first embodiment of the present invention.
Figures 6, 7:
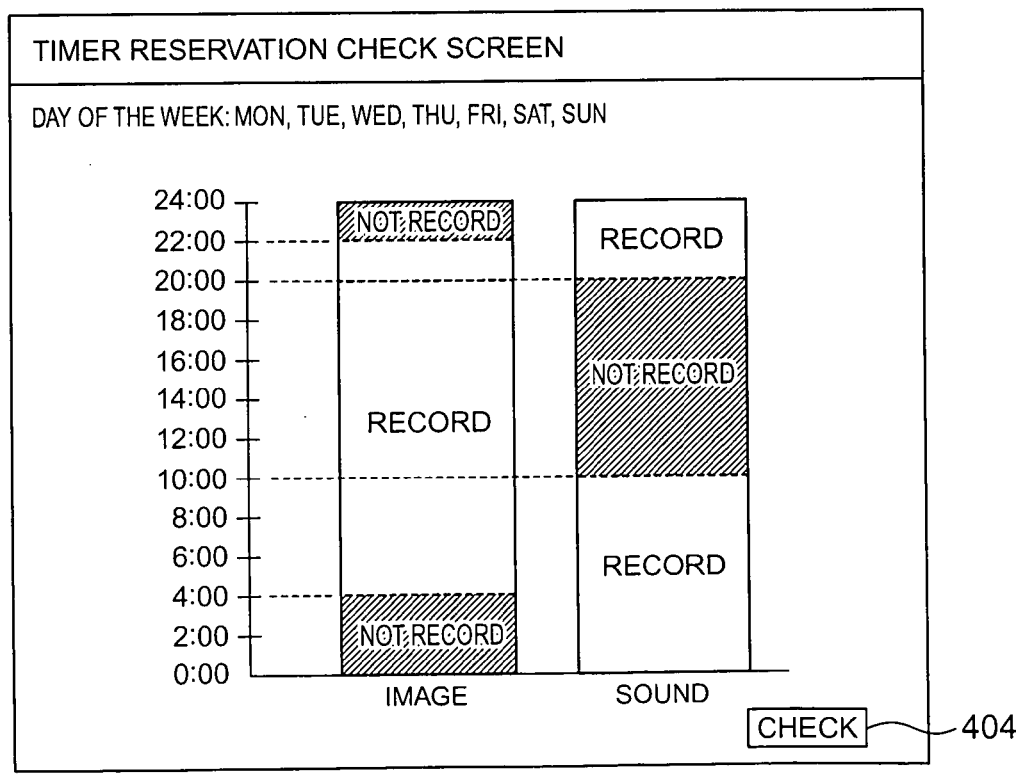
FIG. 6 is a view showing an exemplary screen of a timer reservation menu (sound) used in the first embodiment of the present invention.
FIG. 7 is a view showing a timer reservation check screen (example 1) used in the first embodiment of the present invention.
Figure 8:
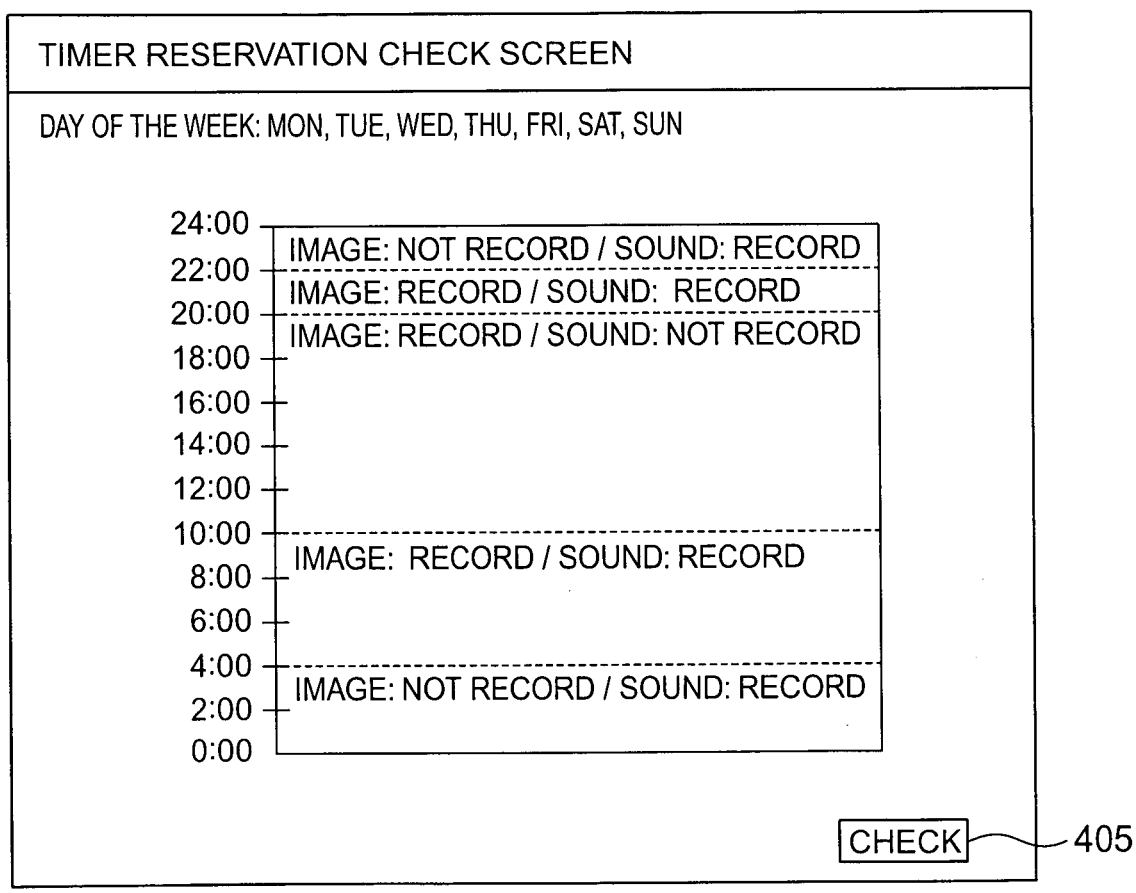
FIG. 8 is a view showing a timer reservation check screen (example 2) used in the first embodiment of the present invention.
Figure 9:
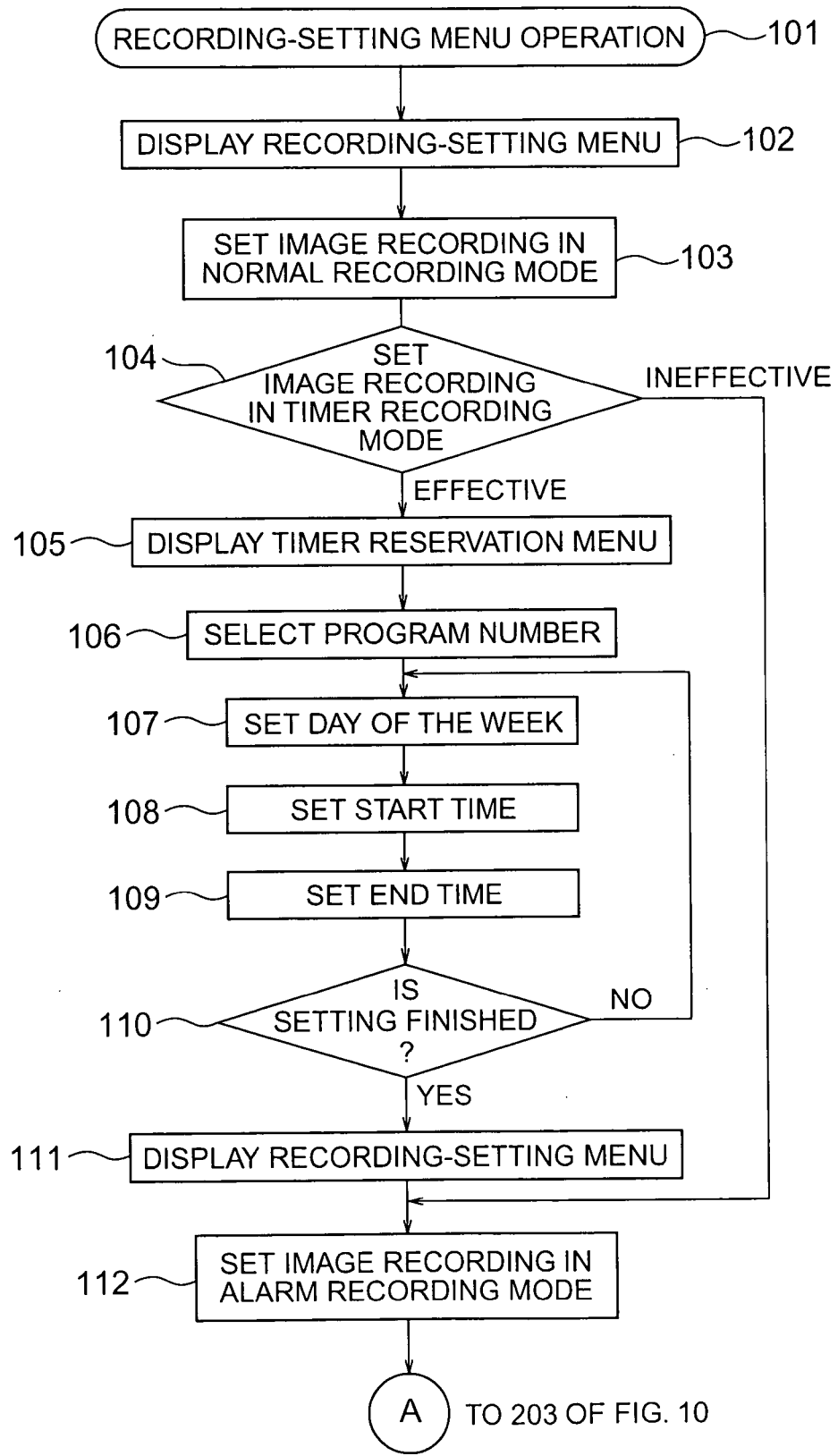
FIG. 9 is a flowchart (part 1) showing the recording-setting process to be executed by the first embodiment of the present invention.

FIG. 3 shows a list of timer reservations to be executed by the first embodiment of the present invention. FIG. 4 shows a screen of a menu for setting recordings according to the first embodiment of the present invention. FIG. 5 shows an example of a screen of a menu (image) for a timer reservation according to the first embodiment of the present invention. FIG. 6 shows a menu for a timer reservation according to the first embodiment of the present invention. FIG. 7 shows a screen (example 1) for checking a timer reservation according to the first embodiment of the present invention. FIG. 8 shows a screen (example 2) for checking a timer reservation according to the first embodiment of the present invention. FIG. 9 is a flowchart (part 1) of the operation of setting the recordings according to the first embodiment of the present invention.

Figure 10:
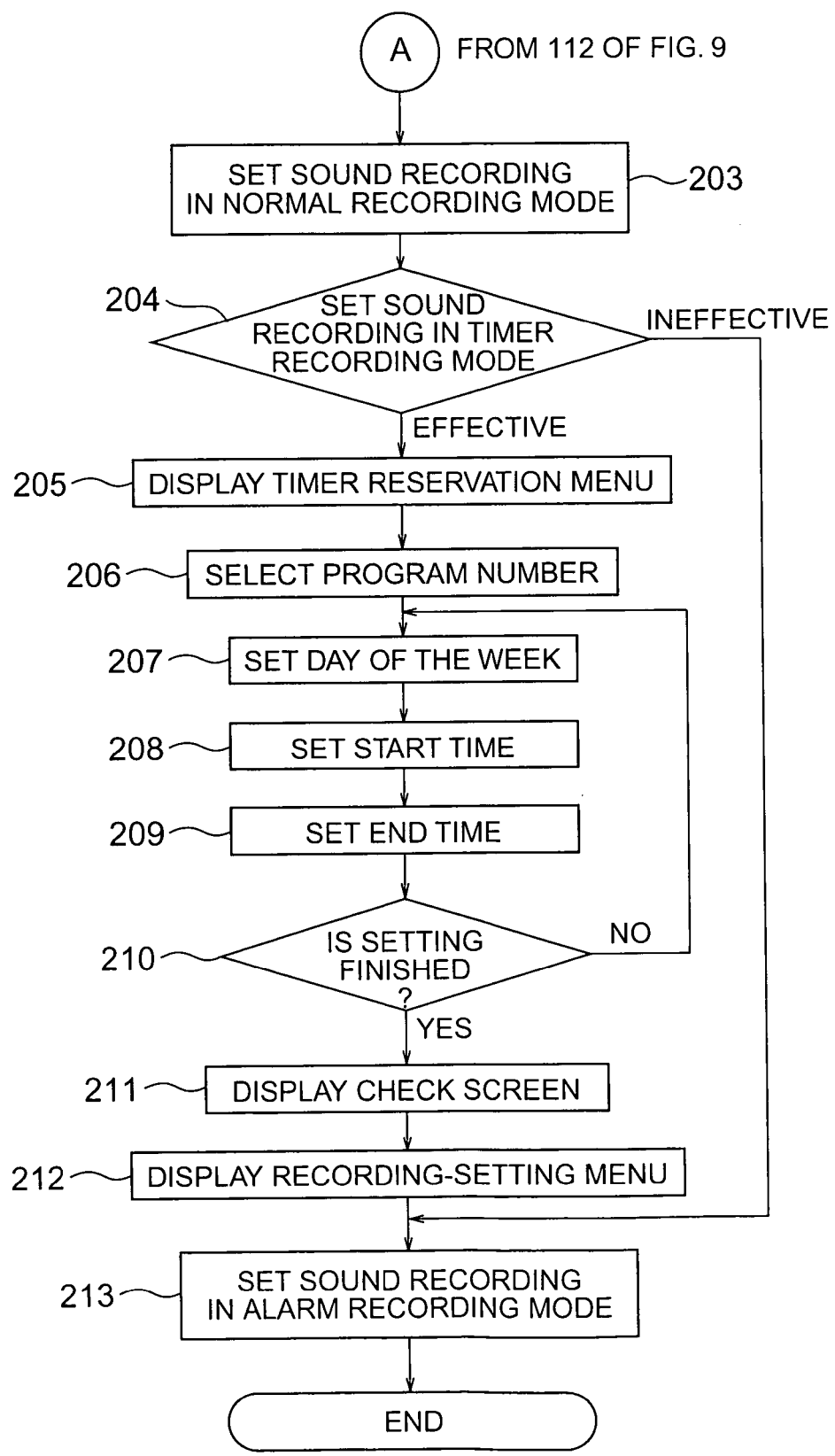
FIG. 10 is a flowchart (part 2) showing the recording-setting process to be executed by the first embodiment of the present invention.

FIG. 10 is a flowchart (part 2) of the operation of setting the recordings according to the first embodiment of the present invention.

In this embodiment, the recording of the image and the sound may be set in each case of normal recording, timer recording and alarm recording. Herein, in the "normal recording", a user or an operator sets a necessity of recording of the image and/or the sound when the image and audio recording apparatus is in the monitoring mode. In the "timer recording", the user sets a time band on which the recording is to be executed separately for the image and the sound. In the "alarm recording", the user sets an alarm signal or a detected motion as a trigger for starting the image or the audio recording.

At first, the concrete example of the timer reservation will be described below. As shown in FIG. 3, the image recording is necessary in the time band of 4:00 to 22:00 when one or more employees exist, the image recording is not necessary in the lights-out time band of 22:00 to 4:00, the audio recording is not necessary in the business hours of 10:00 to 20:00, and the audio recording is necessary in the other time band of 20:00 to 10:00. The flow of operation and its display example will be described below.

In a step 101 shown in FIG. 9, the user opens a menu for setting a recording with a predetermined operation on an input unit 9. In a step 102, a recording-setting menu screen shown in FIG. 4 is displayed. In this step, hence, the setting of the image recording is started. As shown in FIG. 4, on the recording-setting menu screen, the image recording or the audio recording may be set in each type of "normal recording", "timer recording" and "alarm recording". At first, in a step 103, the image recording in the normal recording type is set (for example, the "non-recording" is set.) Then, the process goes to a step 104. In the step 104, the video recording in the timer recording type is set to "effective". Then, in a step 105, the timer menu for reservation (image shown in FIG. 5 is displayed on screen. In the step 104, the image recording in the timer recording type is set to "ineffective". The process goes to a step 112. As shown in FIG. 5, program numbers 1 to 8 are prepared on the timer reservation menu (image) screen so that plural settings may be made available. For each program number, a day of the week, a start time and an end time may be set. At first, in a step 106, any program number (for example, the program 1) is selected from the program numbers listed on the display. Then, in a step 107, the day(s) of the week (for example, all the days of the week [Monday, Tuesday, Wednesday, Thursday, Friday, Saturday, Sunday]) is set. In a step 108, the start time (for example, 04:00) for starting the timer recording is set and in a step 109 the end time (for example, 22:00) is set as well. After the step 109, if another program number is selected, in a step 110, the continuation of the timer reservation is determined. Going back to the step 107, the setting of the next timer reservation is repeated. After the step 109, an "end button" 402 located at the lower right portion of FIG. 5 is pushed, in the step 110, the end of the timer setting for reservation is determined. The process for setting the timer reservation is finished. In a step 111, then, the timer reservation menu (image) screen shown in FIG. 5 is closed and the recording-setting menu screen shown in FIG. 4 is displayed. In a step 112, the image recording in the alarm recording type is set to (for example, "effective"). Then, the process goes to a step 203 shown in FIG. 10, in which the setting of the audio recording is started.

In the step 203, the audio recording in the normal recording type is set to (for example, "non-recording"). Then, the process goes to a step 204. In the step 204, the audio recording in the timer recording type is set to "effective". Next, in a step 205, the timer menu for reservation (sound) shown in FIG. 6 is displayed on screen. In the step 204, the audio recording in the timer recording type is set to "ineffective" and then the process goes to a step 213. As shown in FIG. 6, program numbers 1 to 8 are prepared on the timer menu for reservation (sound) screen so that plural settings is made available like the screen shown in FIG. 5. For each program number, a day of the week, a start time and an end time may be set. At first, in a step 206, any program number (for example, the program 1) is selected from the program numbers listed on screen. In a step 207, the day(s) of the week (for example, all the days of the week (Monday, Tuesday, Wednesday, Thursday, Friday, Saturday, Sunday) is set. In a step 208, the start time (for example, 20:00) for starting the timer recording is set. Then, in a step 209, the end time (for example, 10:00) is set. After the step 209, if another program number is selected, in a step 210, the continuation of the timer reservation is determined. Going back to the step 207, the next timer reservation setting is repeated. After the step 209, if an "end button" 403 located in the right lower portion of FIG. 6 is pushed, in the step 210, the end of the timer reservation setting is determined and then the process of setting the timer reservation is finished. Then, in a step 211, the timer reservation menu (sound) screen shown in FIG. 6 is closed and the timer reservation check screen (example 1) shown in FIG. 7 or the timer reservation check screen (example 2) shown in FIG. 8 is displayed. The screens shown in FIGS. 7 and 8 are the check screen on which it is checked if the correct setting is performed according to the process of FIG. 3. FIG. 7 shows the time bands with and without a necessity of recording separately for image or sound. FIG. 8 shows the time bands with and without a necessity of image recording or audio recording. Through these displays, the user may check if he or she can make sure of his or her intentional setting. This check leads to lessening the possibility of his or her failure of setting.

If the correct setting is confirmed on the timer reservation check screen in the step 211, the "check button" 404 or 405 located in the right lower portion of FIG. 7 or 8 is pushed for ending up the timer setting for reservation. Then, in a step 212, the timer reservation check screen shown in FIG. 7 or 8 is closed and the recording-setting menu screen shown in FIG. 4 is displayed. Afterwards, in a step 213, the audio recording in the alarm recoding type is set to ("effective", for example) and the "end button" 401 is pushed, and the recording-setting process is finished.

Figure 11:
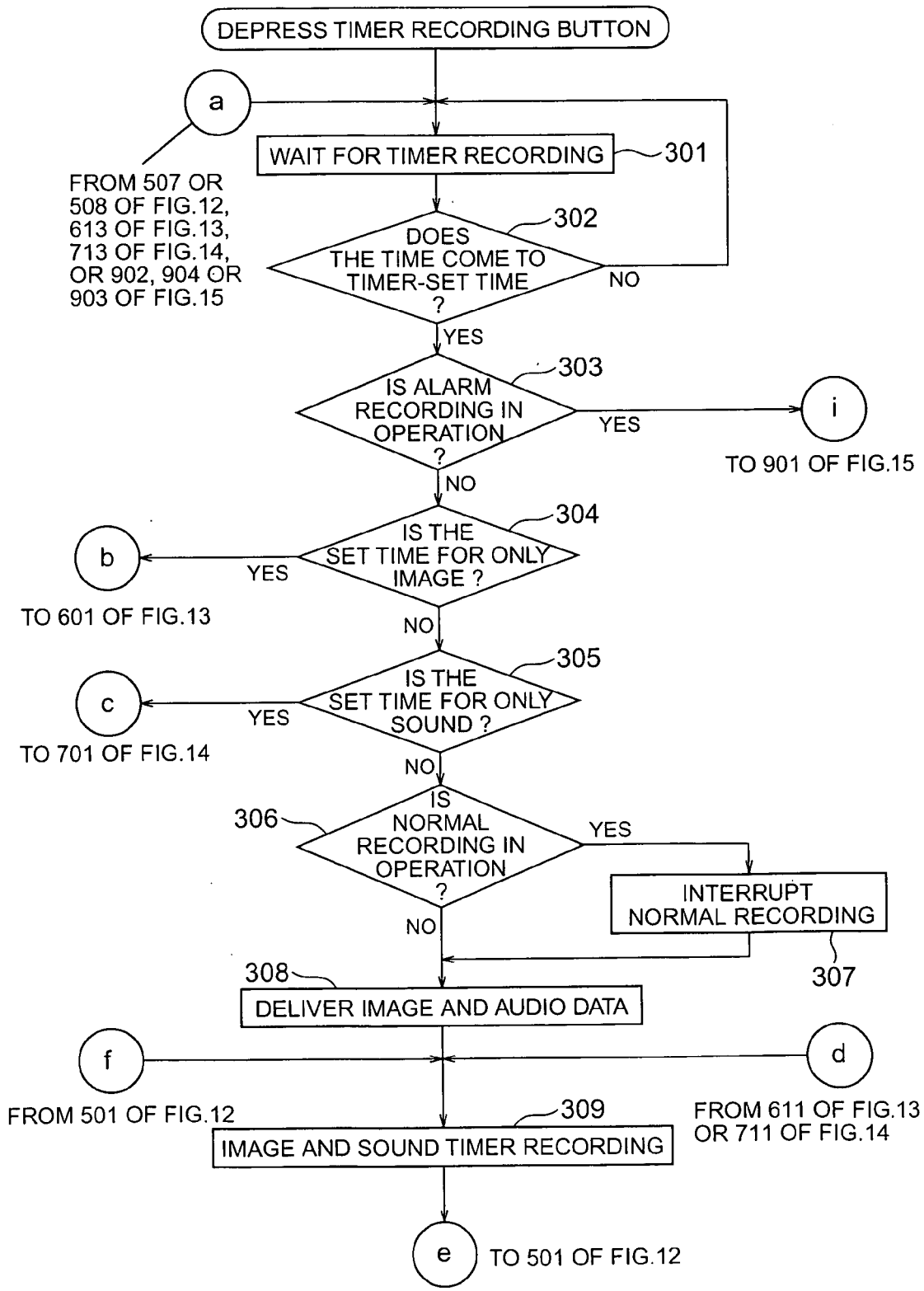
FIG. 11 is a flowchart (part 1) showing a timer recording process to be executed by the first embodiment of the present invention.
Figure 12:
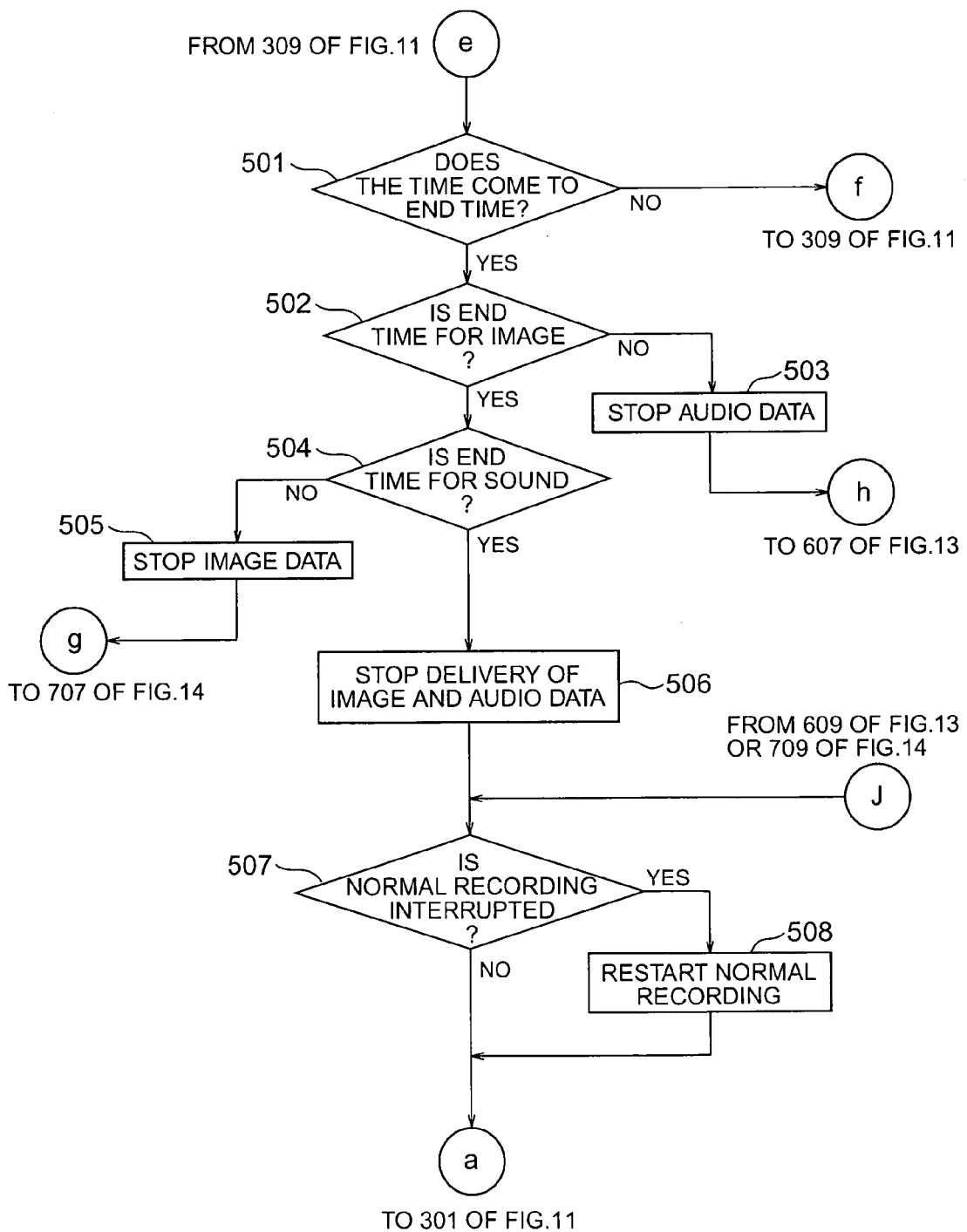
FIG. 12 is a flowchart (part 2) showing a timer recording process to be executed by the first embodiment of the present invention.
Figure 13:
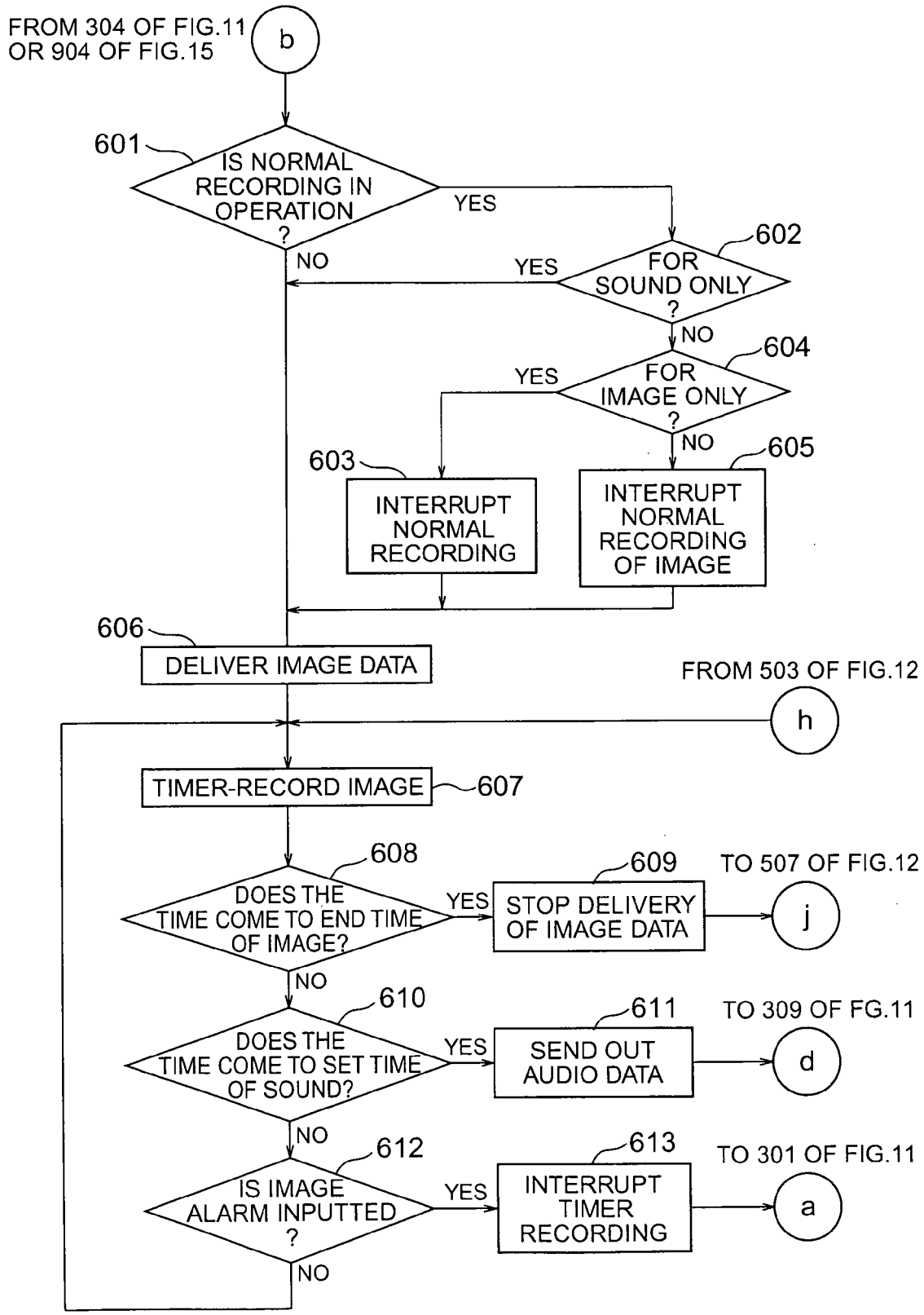
FIG. 13 is a flowchart (part 3) showing a timer recording process to be executed by the first embodiment of the present invention.
Figure 14:
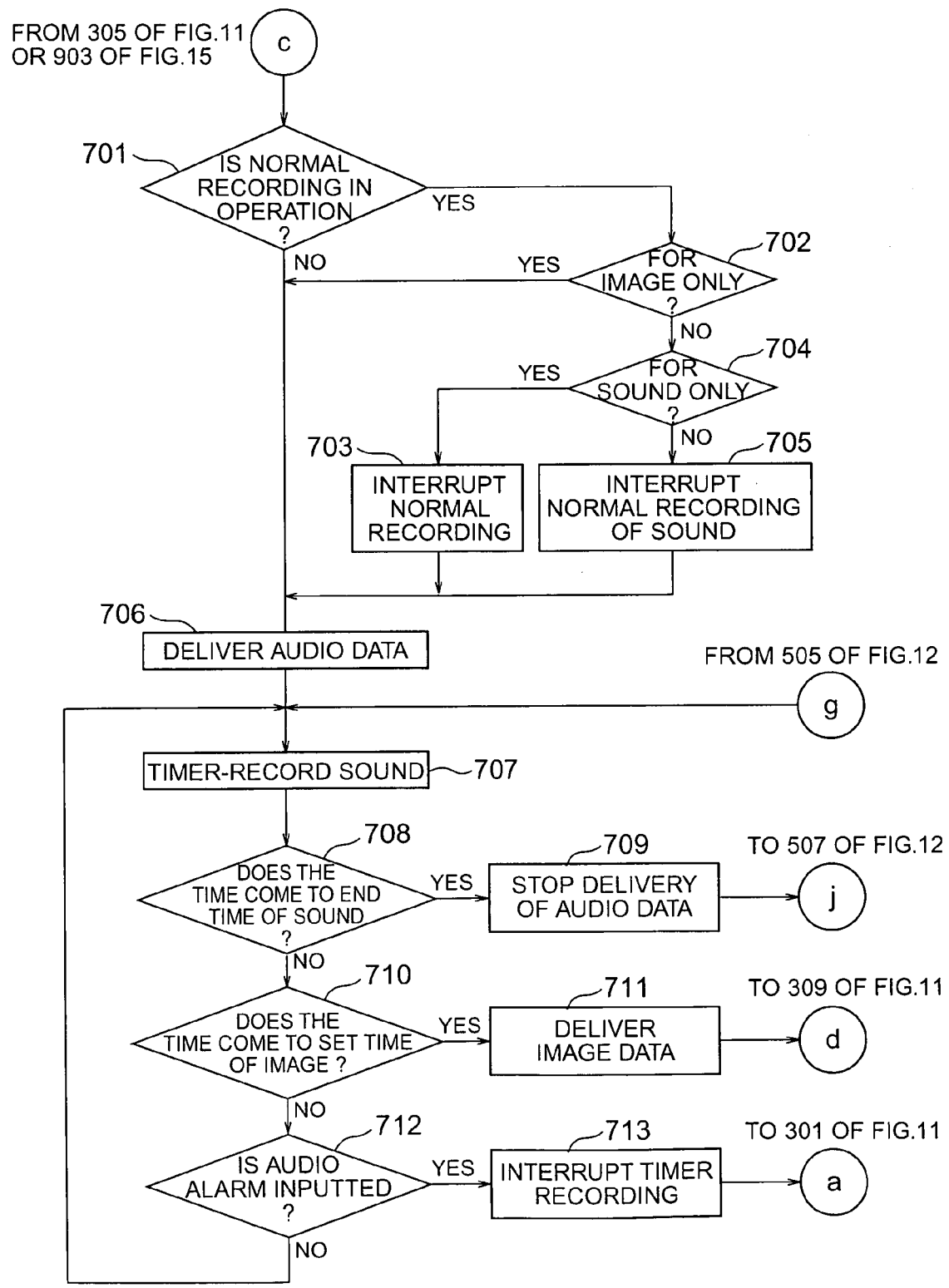
FIG. 14 is a flowchart (part 4) showing a timer recording process to be executed by the first embodiment of the present invention.
Figure 15:
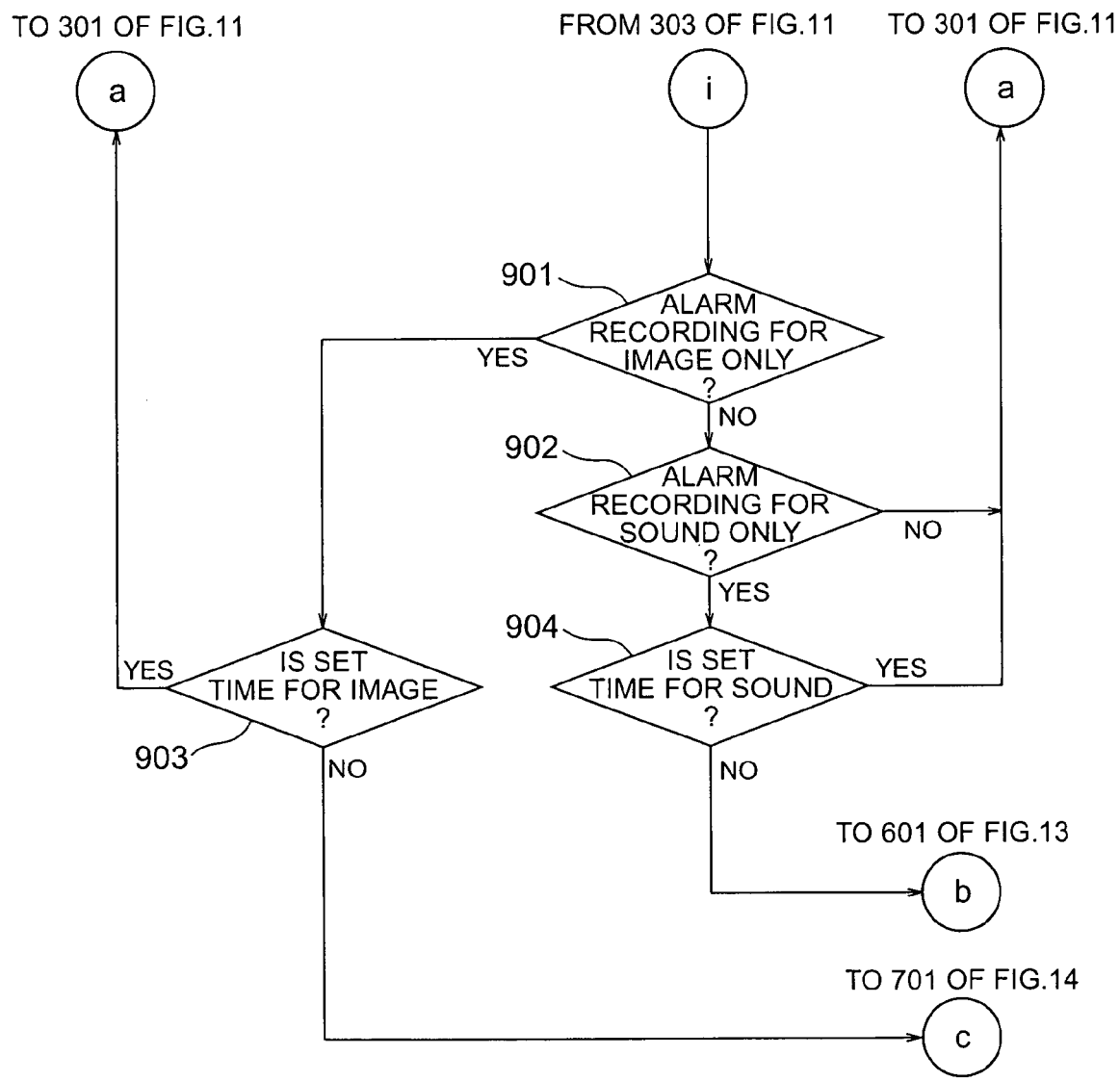
FIG. 15 is a flowchart (part 5) showing a timer recording process to be executed by the first embodiment of the present invention.

In turn, the description will be oriented to the operating process of the timer recording to be executed by the image and audio recording apparatus according to the first embodiment of the present invention with reference to FIGS. 11 to 15. FIG. 11 is a flowchart (part 1) showing a timer recording process to be executed by the first embodiment of the present invention. FIG. 12 is a flowchart (part 2) showing the timer recording process to be executed by the first embodiment of the present invention. FIG. 13 is a flowchart (part 3) showing the timer recording process to be executed by the first embodiment of the present invention. FIG. 14 is a flowchart (part 4) showing the timer recording process to be executed by the first embodiment of the present invention. FIG. 15 is a flowchart (part 5) showing the timer recording process to be executed by the first embodiment of the present invention.

After the timer recording for reservation is set, the user depresses a timer recording button with the input unit 9. In a step 301 shown in FIG. 11, the system becomes the timer recording standby state. Then, in a step 302, it is determined if the time comes to the set time of the timer recording. If in the step 302 the time does not come to the set time (NO), the process goes back to the step 301, in which the system stays in the timer recording standby state. If in the step 302 the time comes to the set time (YES), the process goes to a step 303. In this step, it is determined if the system is in the alarm recording state. If it is in the alarm recording state (YES), the process goes to a step 901 of FIG. 15 (to be discussed later).

If it is not in the alarm recording state (NO), the process goes to a step 304. In this step, it is determined if the setting at the current set time of the timer recording is for the image recording only. If it is for the image recording only (YES), the process goes to a step 601 of FIG. 13 (to be discussed later). If it is not for the image recording only (NO), the process goes to a step 305. In this step, it is determined if the setting at the current set time of the timer recording is for the sound recording only. If it is for the sound recording only (YES), the process goes to a step 701 of FIG. 14 (to be discussed below). If it is not for the sound recording only (NO), it is determined that it is the set time of both the image and the sound recordings and then the process goes to the step 306. In the step 306, it is determined if the system is in the normal recording. If it is not in the normal recording (NO), the process goes to a step 308. If it is in the normal recording (YES), since the timer recording is given priority over the normal recording, the normal recording is interrupted in the step 307 and the history of the interruption is written in a history storage unit 11. Then, the process goes to the step 308.

In the step 308, the delivery of the compressed image data and the compressed audio data is started from the image compressing and expanding unit 2 and the audio compressing and expanding unit 2*a* to the communicating unit 4 under the control of the system controller 8. Then, in the step 309, the image data and the audio data are timer-recorded. Afterwards, the process goes to a step 501 of FIG. 12.

In the step 501, it is determined that the time comes to the end time of the timer recording. If it is not the end time (NO), the process goes back to the step 309 of FIG. 11, in which step the timer recording is continued. If in the step 501 it is the end time (YES), the process goes to a step 502. In the step 502, it is determined if the end time is the end time of the image recording. If it is not the end time of the image recording (NO), it is determined that the end time is for the audio recording. In a step 503, the delivery of the compressed audio data from the audio compressing and expanding unit 2*a* is stopped. Then, the process goes to a step 607 of FIG. 13 (to be discussed later). If in the step 502 the end time is for the image recording (YES), the process goes to a step 504. In the step 504, it is determined if the end time is for the sound recording. If in the step 504 it is not for the audio recording (NO), it is determined that the end time is for the image recording. Then, in the step 505, the delivery of the compressed image data from the image compressing and expanding unit 2 is stopped. Then, the process goes to a step 707 of FIG. 14 (to be discussed later). If in the step 504 the end time is for the sound recording (YES), it is determined that the end time is for the image and the sound recordings. Then, in the step 506, the delivery of the compressed image data and the compressed audio data from the image compressing and expanding unit 2 and the audio compressing and expanding unit 2*a* to the communicating unit 4 is stopped, and the process goes to a step 507. In the step 507, it is determined if the normal recording is interrupted in the step 307 on the basis of the information read out of the history storage unit 11. If the normal recording is not interrupted (NO), the process goes back to the step 301, in which the system is in the timer recording standby state. If the normal recording is interrupted (YES), the normal recording is restarted in the step 508. Then, the process goes back to the step 301, in which the system is in the timer recording standby state.

In turn, the description will be oriented to the operation to be executed when it is determined (YES) in the step 304 of FIG. 11 that the set time of the timer recording is determined to be only for the image recording and then the process goes to the step 601 of FIG. 13. In the step 601, it is determined if the system is in the normal recording state. If it is not in the normal recording state (NO), the process goes to a step 606. If it is in the normal recording state (YES) in the step 601, the process goes to a step 602. In the step 602, it is determined if the normal recording is for the sound only. If the normal recording is for the sound only (YES), since no interference is brought about in the timer recording of the image data, the process goes to a step 606 as keeping the normal recording of the audio data. If the normal recording is not for the sound only (NO), the process goes to a step 604.

In the step 604, it is determined if the normal recording is for the image, if it is for the image only (YES), since the normal recording interferes with the timer recording of the image, the timer recording is given priority over the normal recording, so that the normal recording is interrupted in the step 603. The history of the interruption is written in the history storage unit 11. Then, the process goes to the step 606. If the normal recording is not for the image only in the step 604 (NO), it is determined that the normal recording is for the image and the audio data, in the step 605, the normal recording of the image, which interferes with the timer recording of the image, is interrupted, the history of the interruption is written in the history storage unit 11, and then the process goes to the step 606 as keeping the normal recording of the audio data. In the step 606, the delivery of the compressed image data is started from the image compressing and expanding unit 2 to the communicating unit 4 under the control of the system controller 8, and then in a step 607, the timer recording of the image data is started. Going to a step 608, it is determined if the time comes to the end time of the timer recording of the image data. If it comes to the end time (YES), the process goes to a step 609, in which step the delivery of the compressed image data is stopped. Then, the process goes to the step 507 of FIG. 12, in which step it is determined if the normal recording is interrupted in the steps 603 or 605 on the basis of the information read out of the history storage unit 11. If the normal recording is not interrupted (NO), the process goes back to the step 301, in which step the system becomes the timer recording standby state. If the normal recording is interrupted (YES), the normal recording is restarted in the step 508, and then the process goes back to the step 301 in which the system becomes the timer recording standby state.

If it is determined in the step 608 that the time does not come to the end time (NO), the process goes to a step 610, in which step it is determined if the time comes to the set time of the timer recoding for the audio data. If it comes to the set time thereof (YES), the process goes to a step 611. In this step, the compressed audio data is sent out. Then, the process goes to the step 309 of FIG. 11 in which the system becomes the timer recording state of the image and the audio data.

If it is determined in the step 610 that the time does not come to the set time of the timer recording of the audio data (NO), the process goes to a step 612, in which it is determined if the image alarm is inputted. If it is inputted (YES), since the alarm recording is given priority over the timer recording, the process goes to a step 613 in which the timer recording of the image data is interrupted. Then, the process goes back to the step 301, in which the system becomes the timer recording standby state. If no image alarm is inputted (NO) in the step 612, the process goes back to the step 607, in which the timer recording of the image data is continued.

In turn, the description will be oriented to the operation to be executed when it is determined in the step 305 of FIG. 11 that the set time of the timer recording is for the audio data only (YES) and the process goes to a step 701 of FIG. 14. In the step 701, it is determined if the system stays in the normal recording state. If it is not in the normal recording state (NO), the process goes to a step 706. If it is in the normal recording state (YES) in the step 701, the process goes to a step 702. In the step 702, it is determined if the normal recording is for the image data only. If it is for the image data only (YES), since no interference is brought about in the timer recording of the sound, the process goes to the step 706 as keeping the normal recording of the image. If the normal recording is not for the sound only (NO), the process goes to a step 704.

In the step 704, it is determined if the normal recording is for the sound only. If it is for the sound only (Yes), since the normal recording interferes with the timer recording of the sound, the timer recording is given priority over the normal recording. Hence, in the step 703, the normal recording is interrupted, the history of the interruption is written in the history storage unit 11, and then the process goes to the step 706. If it is determined in the step 704 that the normal recording is not for the sound only (NO), it is determined that the image and the sound are being recorded at a normal mode. Then, in the step 703, the normal recording of the sound, which interferes with the timer recording of the sound, is interrupted, the history of the interruption is written in the history storage unit 11, and then the process goes to the step 706 as keeping the normal recording of the image. In the step 706, the delivery of the compressed audio data is started from the audio compressing and expanding unit 2a to the communicating unit 4 under the control of the system controller 8, and then in a step 707 the timer recording of the sound is started. Next, in a step 708, it is determined if the time comes to the end time of the timer recording of the sound. If it comes to the end time (YES), the process goes to a step 709. In the step 709, the delivery of the compressed audio data is stopped. Then, the process goes to the step 507 of FIG. 12, in which step it is determined if the normal recording is interrupted in the step 703 or 705 on the basis of the information read out of the history storage unit 11. If the normal recording is interrupted (NO), the process goes back to the step 301 in which the system becomes the timer recording standby state. If the normal recording is interrupted (YES), in the step 508, the normal recording is restarted and then the process goes back to the step 301 in which the system becomes the timer recording standby state.

If it is determined in the step 708 that the time does not come to the end time (NO), the process goes to a step 710, in which step it is determined if the time comes to the set time of the timer recording of the image. If it comes to the set time (YES), the process goes to a step 711. In this step, the compressed image data is sent out and then the process goes to the step 309 of FIG. 11 in which the system becomes the timer recording state of the image and the sound.

If it is determined in the step 710 that the time does not come to the set time of the timer recording of the image, the process goes to a step 712, in which it is determined if an audio alarm is inputted. If an audio alarm is inputted (YES), since the alarm recording is given priority over the timer recording, the process goes to a step 713. In this step 713, the timer recording of the image is interrupted. Then, going back to the step 301 of FIG. 11, the system becomes the timer recording standby state. If no audio alarm is inputted (NO), the process goes back to the step 707, in which step the timer recording of the sound is continued.

In turn, the description will be oriented to the operation to be executed when the delivery of the compressed audio data from the audio compressing and expanding unit 2a is stopped in the step 503 and then the process goes to the step 607 of FIG. 13. In the step 607, the timer recording only for the image is continued. Then, in the step 608, it is determined if the time comes to the end time of the timer recording of the image. If the time comes to the end time (YES), the process goes to the step 609, in which the delivery of the compressed image data is stopped. Then, going to the step 507, it is determined if the normal recording is interrupted in the step 603 or 605 on the basis of the information read out of the history storage unit 11. If the normal recording is not interrupted (NO), the process goes back to the step 301 in which the system becomes the timer recording standby state. If the normal recording is interrupted (YES), the normal recording is restarted in the step 508, and then the process goes back to the step 301 in which the system becomes the timer recording standby state.

If it is determined in the step 608 that the time does not come to the end time(NO), the process goes to the step 610, in which it is determined if the time comes to the set time of the timer recording of the sound. If the time comes to the set time of the timer recording of the sound (YES), the process goes to the step 611 in which the compressed audio data is sent out. Then, going to the step 309 of FIG. 11, the system becomes the image and the audio timer recording state.

If the time does not come to the set time of the timer recording of the sound in the step 610 (NO), the process goes to the step 612, in which step it is determined if an image alarm is inputted. If an image alarm is inputted (YES), since the alarm recoding is given priority over the timer recording, the process goes to a step 613. In this step, the timer recording of the image is interrupted. Then, the process goes back to the step 301 of FIG. 11 in which the system becomes the timer recording standby state. If no image alarm is inputted (NO), the process goes back to the step 607, in which the timer recording of the image is continued.

In turn, the description will be oriented to the operation to be executed when the process is executed to stop the delivery of the compressed image data from the image compressing and expanding unit 2 in the step 505 of FIG. 12 and then the process goes to the step 707 of FIG. 14. In the step 707, the timer recording is continued for the sound only. Next, in the step 708, it is determined if the time comes to the end time of the timer recording of the sound. If the time comes to the end time (YES), the process goes to the step 709 in which the delivery of the compressed audio data is stopped. Then, going to the step 507 of FIG. 12, it is determined if the normal recording is interrupted in the step 703 or 705 on the basis of the information read out of the history storage unit 11. If the normal recording is not interrupted (NO), the process goes back to the step 301 in which the system becomes the timer recording standby state. If the normal recording is interrupted (YES), in the step 508, the normal recording is restarted. Then, going back to the step 301, the system enters into the timer recording standby state.

If it is determined in the step 708 that the time does not come to the end time (NO), the process goes to the step 710, in which it is determined if the timer comes to the set time of the timer recording of the image. If the timer comes to the set time thereof (YES), the process goes to the step 711. In this step, the compressed image data is sent out. Then, the process goes to the step 309 of FIG. 11 in which the system becomes the timer recording state of the image and the sound.

If it is determined in the step 710 that the time does not come to the set time of the timer recording of the image (NO), the process goes to the step 712, in which it is determined if an audio alarm is inputted. If an audio alarm is inputted (YES), since the alarm recording is given priority over the timer recording, the process goes to the step 713 in which the timer recording of the image is interrupted. Then, going back to the step 301 of FIG. 11, the system becomes the timer recording standby state. If no audio alarm is inputted (NO), the process goes back to the step 707 in which the timer recording of the sound is continued.

In turn, the description will be oriented to the operation to be executed when it is determined in the step 303 of FIG. 11 that the alarm recording is in operation (YES) and the process goes to the step 901 of FIG. 15. In the step 901, it is determined if the alarm recording in operation is concerned with the image only. If it is concerned with the image only (YES), the process goes to the step 903. In the step 903, it is determined if the time comes to the set time of the timer recording of the image. If the time comes to the set time thereof (YES), since the timer recording of the image interferes with the alarm recording of the image, the alarm recording of the image is given priority over the timer recording of the image. Hence, the process goes back to the step 301 of FIG. 11 in which the system becomes the timer recording standby state.

If it is determined in the step 903 that the time does not come to the set time of the timer recording of the image (NO), it is determined that the time comes to the set time of the timer recording of the sound. In this case, since the timer recording of the sound does not interfere with the alarm recording of the image, the process goes to the step 701 of FIG. 14. In a case that it is determined in the step 901 that the alarm recording does not concern with the image only (NO), the process goes to the step 902. In this step, it is determined if the alarm recording being in operation concerns with the sound only. If it does not concern with the sound only (NO), it is determined that the alarm recording being in operation concerns with the image and the sound. Then, the process goes back to the step 301 of FIG. 11, in which the system enters into the timer recording standby state. If it is determined in the step 902 that the alarm recording being in operation concerns with the sound only (YES), the process goes to the step 904. In the step 904, it is determined if the time comes to the set time of the timer recording of the sound. If the time comes to the set time thereof (YES), since the timer recording of the sound interferes with the alarm recording of the sound, the alarm recording of the sound is given priority over the timer recording of the sound. Hence, the process goes back to the step 301 of FIG. 11, in which the system becomes the timer recording standby state. If the time does not come to the set time thereof (NO), it is determined that the time comes to the set time of the timer recording of the image. In this case, since the timer recording of the image does not interfere with the alarm recording of the sound, the process goes to the step 601 of FIG. 13.

Figure 16:
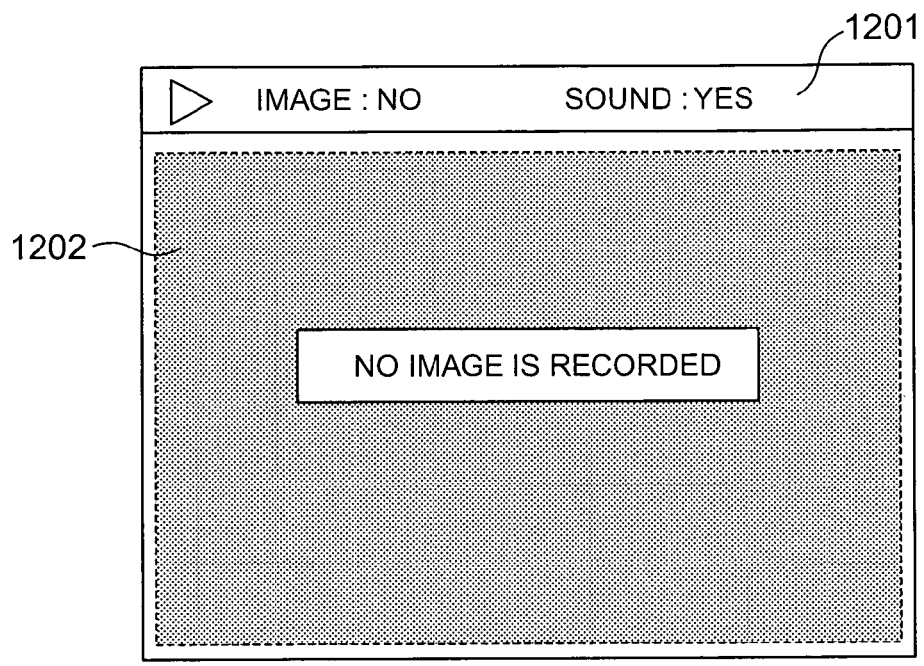
FIG. 16 is a view showing an exemplary reproducing screen appearing when only the sound is recorded, used in the first embodiment of the present invention.
Figure 17:
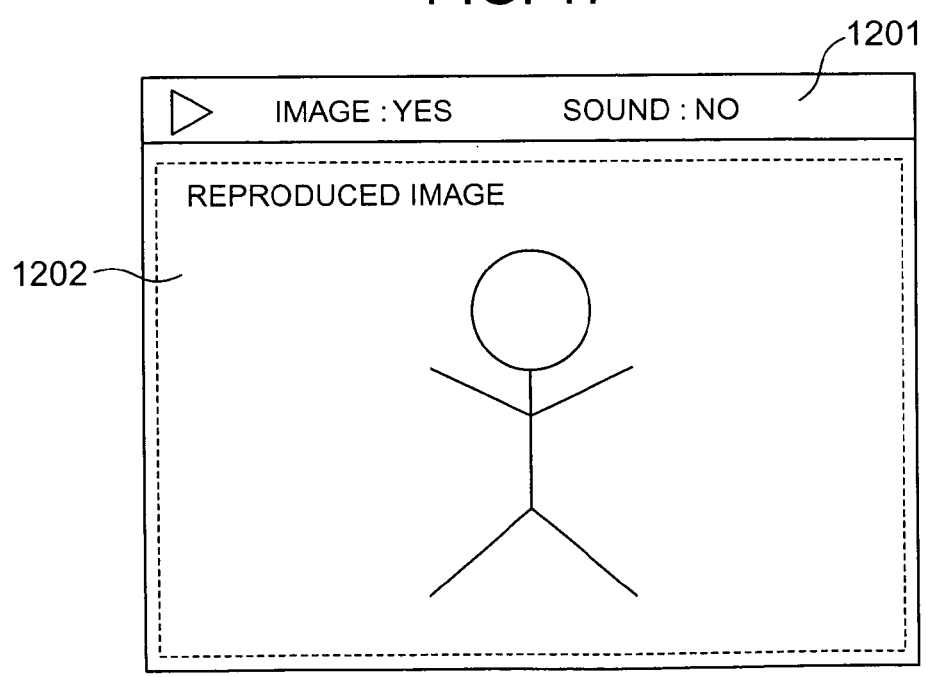
FIG. 17 is a view showing an exemplary reproducing screen appearing when only the image is recorded, used in the first embodiment of the present invention.

Further, if the timer recording setting of the present invention is used for the recording operation, there may be three time band patterns, a time band on which only the image is recorded, a time band on which only the sound is recorded and a time band on which both the image and the sound are recorded. In this embodiment, therefore, the information is displayed on the reproduced screen so that the viewer may make sure of the time band pattern of the currently reproducing screen. The example of the display being reproduced according to the first embodiment of the present invention will be described with reference to FIGS. 16 and 17. FIG. 16 shows an example of a reproduced screen appearing when only the sound is recorded according to the first embodiment of the present invention. FIG. 17 shows an example of a reproduced screen appearing when only the image is recorded.

If only the sound is recorded, no image is displayed on screen when reproducing the recorded data, and it is necessary to distinguish this case from a failure. As shown in FIG. 16, therefore, the messages of "image: no" and "sound: yes" are displayed on an information display area 1201. Moreover, on an image display area 1202 is displayed a message of "no image is recorded" with the background image like a blue back image.

If only the image is recorded, the sound is not outputted when reproducing the data, and it is necessary to distinguish this case from a failure. As shown in FIG. 17, therefore, the messages of "image: yes" and "sound: no" is displayed on the information display area 1201. Moreover, a reproduced image is displayed on the information display area 1202.

In this embodiment, the description has been concerned with only the setting of a necessity of recording the image or the sound. In addition to this setting, the recording modes such as an image quality, a sound quality, recording intervals and a resolution may be optionally set.

2. Second Embodiment

Figure 19:
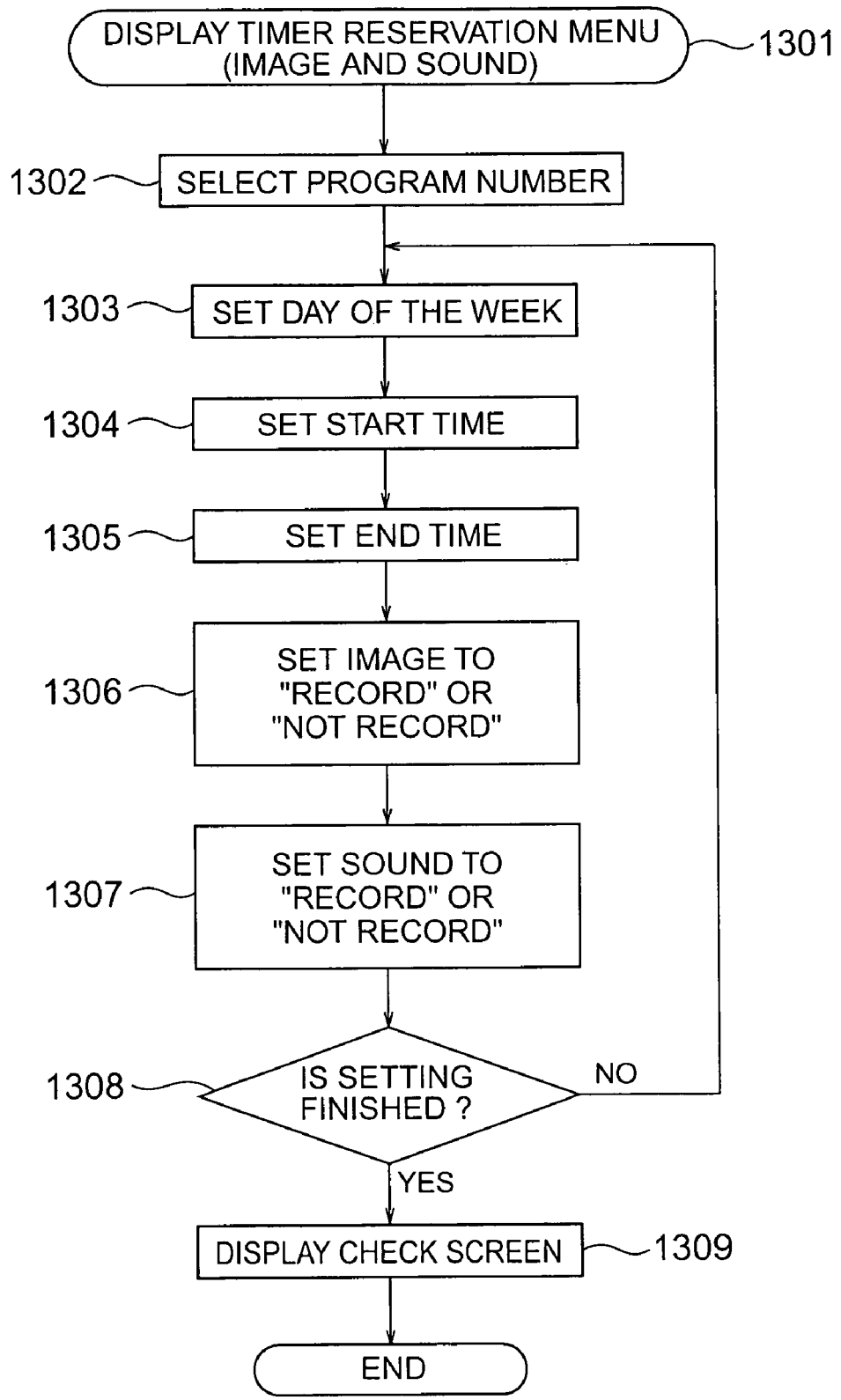
FIG. 19 is a flowchart showing a timer reservation operation to be executed by the second embodiment of the present invention.

The image and audio recording apparatus according to the second embodiment of the present invention will be described with reference to FIGS. 18 to 20. The second embodiment is different from the first embodiment in the following respect. That is, the first embodiment takes the steps of setting the normal recording to "ineffective", setting a time band on which the image and/or the sound are/is recorded with a timer, and recording the necessary data only, while the second embodiment takes the steps of setting a toggle of "recording" or "not recording" the image and the sound on each time band and recording the necessary data only on each time band. Further, for the second embodiment, the normal recording is constantly fixed to the "recording" state. Herein, the description is mainly oriented to the method of setting a timer reservation menu that is different from that of the first embodiment. This description will be expanded on the assumption that the second embodiment also has the same recording setting as shown in FIG. 3 of the first embodiment.

The flow of process to be executed when setting a timer reservation in the second embodiment of the present invention and its exemplary display will be described with reference to FIGS. 18 and 19. FIG. 18 shows an exemplary screen of the timer reservation menu (image and sound) in the second embodiment of the present invention. FIG. 19 shows a flowchart showing the process of setting the recording in the second embodiment of the present invention.

When a user executes a given operation of opening the timer reservation menu (image and sound) with the input unit 9, in a step 1301, the timer reservation menu (image and sound) shown in FIG. 18 is displayed on screen. Herein, the program numbers 1 to 8 are prepared on the timer reservation menu (image and sound) screen shown in FIG. 18 so that plural settings are made available. For each program number, a day of the week, a start time, an end time, a necessity of image recording and a necessity of audio recording may be set on the menu screen.

Any program number (for example, the program 1) is selected from the program numbers listed in the step 1302. In a step 1303, a day of the week (for example, all the days of the week "Monday, Tuesday, Wednesday, Thursday, Friday, Saturday and Sunday") is set. In a step 1304, a start time (for example, 22:00) for starting the timer recording is set. In a step 1305, an end time (for example, 04:00) is set. Then, the process goes to a step 1306. In the step 1306, for setting a necessity of image recording, the recording operation is set to "record" in the case of recording the image or "not record" in the case of not recording the image. Then, the process goes to a step 1307. In the step 1307, for setting a necessity of audio recording, the recording operation is set to "record" in the case of recording the sound or "not record" in the case of not recording the sound. Herein, the image recording is set to "not record", while the audio recording is set to "record". After the step 1307, in the case of setting plural timer reservations (for example, in the case of changing a time band on which the data is to be recorded for each day of the week), by selecting another program number, it is determined that the timer reservation is continued in the step 1308. Then, the process goes back to the step 1303, in which the setting of the next timer reservation is repeated. Herein, it is necessary to set the programs 1 to 2 as shown in FIG. 18. Hence, by selecting the program number 2 after the step 1307, it is determined that the timer reservation is continued in the step 1308. Going back to the step 1303, the process is executed to set the day(s) of the week (for example, all the days of the week "Monday, Tuesday, Wednesday, Thursday, Friday, Saturday and Sunday") and set the start time "10:00" in the step 1304, the end time "20:00" in the step 1305, the image to "record" in the step 1306, and the sound to "not record" in the step 1307. Then, by selecting the "end button" 1801 located in a right lower portion, it is determined that the timer reservation is finished in the step 1308. Then, in the step 1309, the timer reservation menu (image and sound) screen shown in FIG. 18 is closed and then the timer reservation check screen shown in FIG. 7 or 8 is displayed. If it is checked that the setting is correct, the "check button" 404 or 405 is selected, and then the timer reservation setting is finished.

In turn, the operation to be executed in the timer recording of the image and audio recording apparatus according to the second embodiment of the present invention will be described with reference to FIG. 20. FIG. 20 shows a flowchart of the timer recording operation in the second embodiment of the present invention.

Figure 20:
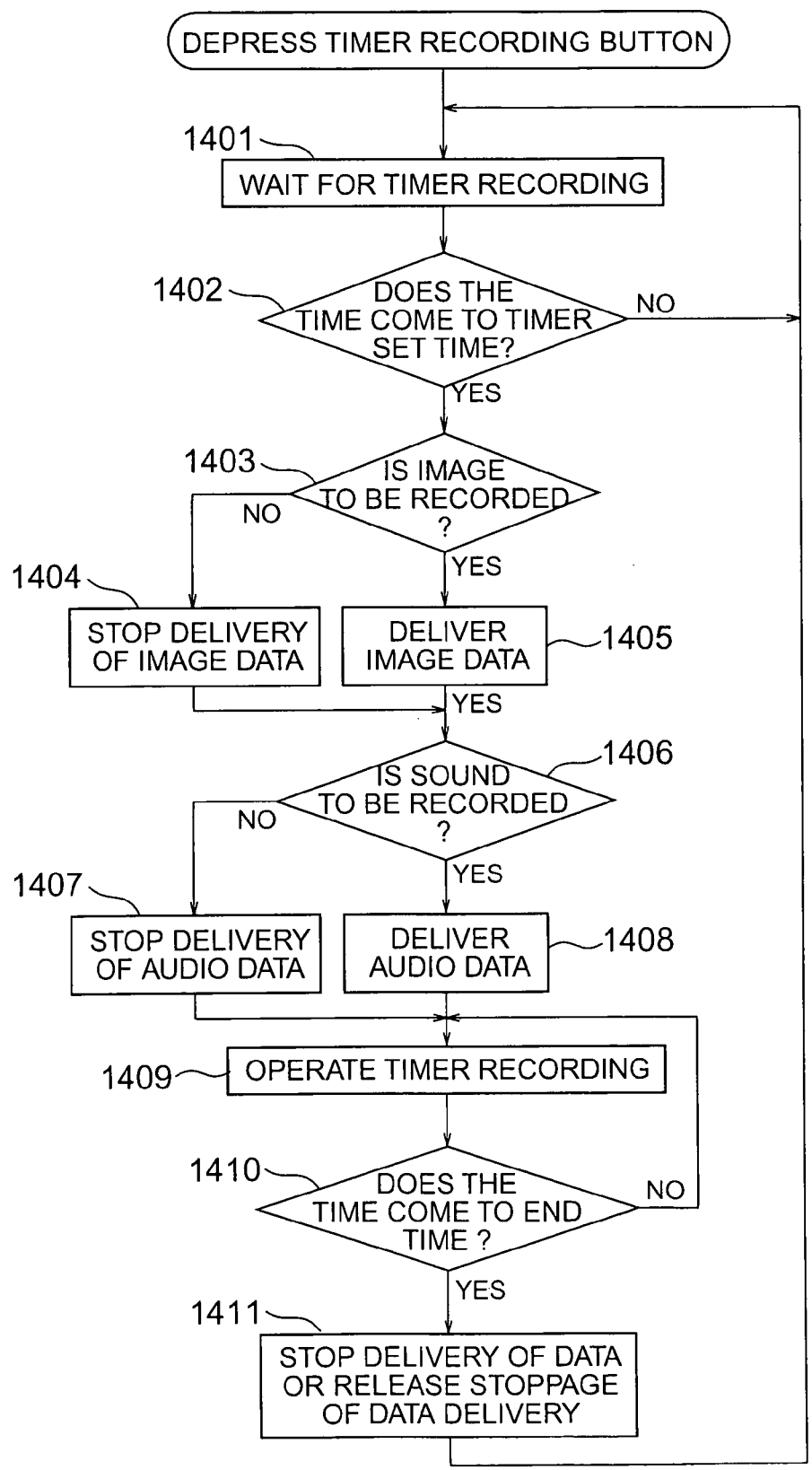
FIG. 20 is a flowchart showing a timer recording operation to be executed by the second embodiment of the present invention.

When the user depresses a timer recording button with the input unit 9 after setting the timer recording, in a step 1401 of FIG. 20, the system becomes the timer recording standby state. Then, in a step 1402, it is determined if the time comes to the timer set time. If it is determined in the step 1402 that the time comes to the timer set time (NO), the process goes back to the step 1401, in which the system becomes the timer recording standby state. If it is determined in the step 1402 that the time comes to the timer set time (YES), the process goes to a step 1403.

In the step 1403, it is determined if the image is to be recorded. If the image is not recorded (NO), in a step 1404, the delivery of the data from the image compressing and expanding unit 2 to the recording medium communicating unit 6 is stopped in response to an instruction issued by the system controller 8. Then, the process goes to a step 1406. If the image is recorded (YES) in the step 1403, the data is delivered from the image compressing and expanding unit 2 to the communicating unit 6 in response to an instruction issued by the system controller 8. Then, the process goes to the step 1406.

In the step 1406, it is determined if the sound is to be recorded. If the sound is not recorded (NO), in a step 1407, the delivery of the data from the audio compressing and expanding unit 2a to the communicating unit 6 is stopped in response to an instruction issued by the system controller 8. Then, the process goes to a step 1409. If the sound is recorded (YES) in the step 1406, in a step 1408, the data is delivered from the audio compressing and expanding unit 2a to the communicating unit 6 in response to an instruction issued by the system controller 8. Then, the process goes to a step 1409. In the step 1409, the system becomes the timer recording operation. If the determinations in the steps 1406 and 1408 are both in the negative, the image and the sound are not recorded while the timer is in operation.

Afterwards, it is determined in a step 1410 if the time comes to the end time of the timer. If the time does not come to the end time (NO), the process goes back to the step 1409 in which the timer operation is continued. If it is determined in the step 1410 that the time comes to the end time (YES), in a step 1411, the delivery of the data is stopped or the stoppage of the data delivery is released according to the settings of the normal recording. Then, the process goes back to the step 1401, in which the system enters to the timer recording standby state and then returns to the normal recording.

The present embodiment has been described with respect to only the setting of a necessity of image or audio recording when setting a timer reservation. The recording modes such as an image quality, a sound quality, recording intervals an a resolution may be optionally set in this embodiment.

In the first and the second embodiments, unnecessary image or audio data are not recorded. Instead, by cutting the unnecessary image or audio input signal, it is possible to record a voiceless sound signal or a pictureless image signal. By recording the voiceless sound signal or the pictureless image signal, it is also possible to reduce the data amount after the data is compressed, thereby making the long-term recording possible.

As described above with respect to the foregoing embodiments, the present invention provides a capability of separately setting the recordings of the image data and the audio data, thereby being able to reduce the unnecessary image or audio recording data and make the long-term recording possible.

As is obvious from the foregoing description, according to an aspect of the present invention, the image and audio recording apparatus having the functions of recording the image data and/or the audio data on the recording medium and timer-recording the data on a set time band is characterized in that the image data and the audio data may be separately recorded on the recording medium when the timer recording is set. Since the recordings of the image data and the audio data may be independently set on each time band, the image and audio recording apparatus is capable of reducing unnecessary image or audio recording data, thereby making the long-term recording possible.

The image and audio recording apparatus is further characterized in that the time band on which the image data is to be recorded may be set separately from the time band on which the audio data is to be recorded. This makes it possible to separately set the time band on which the image is to be recorded and the time band on which the audio is to be recorded. Hence, the image and audio recording apparatus does not need to record the unnecessary image or audio data not to be recorded on a certain time band, thereby being able to reduce the recording data. This thus makes the long-term recording possible.

Further, the image and audio recording apparatus is characterized in that the recording necessities of the image data and the audio data may be separately set. This makes it possible to separately set the record or the non-record of the image data or the audio data for each time band. Hence, the recoding apparatus does not need to record the unnecessary data on each time band and is able to reduce the recording data, thereby making the long-term recording possible.

Moreover, the image and audio recording apparatus is characterized in that the image data and/or the audio data may be set not to be recorded. This thus prevents the unnecessary image or audio data from being recorded. As compared with the record of the voiceless sound data or the pictureless image data, the recording apparatus enables to record data for longer hours.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image and audio recording apparatus comprising:
   recording means for recording image data and audio data on a recording medium;
   timer reservation means for setting first a time band on which said image data is to be recorded on said recording medium using a first menu screen provided for said image data and setting a second time band on which said audio data is to be recorded on said recording medium using a second menu screen provided for said audio data, via a display means by a user, wherein the first time band for image data and the second time band for audio data are set independently, and the first menu screen and the second menu screen are separately provided; and
   control means for controlling said recording means to perform recording of said image data during the first time band and said audio data during the second time band.

2. An image and audio recording apparatus as claimed in claim 1,
   wherein said timer reservation means separately displays in said menu screens on said display means said time band on which recording of said image data is set and said time band on which recording of said audio data is set.

3. An image and audio recording apparatus as claimed in claim 1,
   wherein said timer reservation means displays on one screen of said display means all of the time band on which recording of said image data is set, the time band on which recording of said image data is not set, the time band on which recording of said audio data is set, and the time band on which recording of said audio data is not set together to make the user confirm a timer reservation setting.

4. An image and audio recording apparatus as claimed in claim 1, further comprising:
   reproducing means for reproducing said image data and said audio data recorded on said recording medium; and
   wherein said reproducing means display means a message of the absence of audio data in the case of reproducing said image data recorded on said recording medium with no corresponding audio data.

5. An image and audio recording apparatus as claimed in claim 1, further comprising:
   reproducing means for reproducing said image data and said audio data recorded on said recording medium; and
   wherein said reproducing means displays on said display means a message of the absence of image data in the case of reproducing said audio data recorded on said recording medium with no corresponding image data.

6. An image and audio recording apparatus as claimed in claim 1,
   wherein, if the time band for the image data recording overlaps the time band for the audio data recording, the control means controls said recording means to record both of the image data and the audio data on the recording medium during the overlapped time band.

7. An image and audio recording apparatus comprising:
   recording means for recording image data and audio data on a recording medium;
   display means for providing multiple menu screens including a menu screen for image data and a menu screen for audio data;
   timer reservation means for receiving image time band data from the display means and for receiving audio time band data from the display means, wherein the received image time band data specifies a time band for recording image data and the received audio time band data specifies a time band for recording audio data independently of the time band for recording image data; and
   control means for controlling said recording means based on the image time band data and the audio time band data to perform recording in response to said audio data and said image data.

\* \* \* \* \*